United States Patent
Yamashita et al.

(10) Patent No.: US 9,129,439 B2
(45) Date of Patent: Sep. 8, 2015

(54) THREE-DIMENSIONAL IMAGE PROCESSING APPARATUS AND THREE-DIMENSIONAL IMAGE PROCESSING METHOD

(71) Applicant: PANASONIC CORPORATION, Osaka (JP)

(72) Inventors: Haruo Yamashita, Osaka (JP); Hiromichi Ono, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 177 days.

(21) Appl. No.: 13/908,476

(22) Filed: Jun. 3, 2013

(65) Prior Publication Data

US 2013/0266213 A1    Oct. 10, 2013

Related U.S. Application Data

(63) Continuation of application No. PCT/JP2012/007005, filed on Nov. 1, 2012.

(30) Foreign Application Priority Data

Nov. 28, 2011    (JP) ................................. 2011-259063

(51) Int. Cl.
*H04N 13/00* (2006.01)
*G06T 7/00* (2006.01)
*G06T 15/20* (2011.01)

(52) U.S. Cl.
CPC ............ *G06T 15/205* (2013.01); *G06T 7/0053* (2013.01); *H04N 13/0022* (2013.01); *G06T 2207/10012* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 5,317,689 A * | 5/1994 | Nack et al. ..................... | 345/505 |
| 7,161,614 B1 * | 1/2007 | Yamashita et al. .............. | 348/42 |
| 2003/0108251 A1 | 6/2003 | Kim et al. | |

(Continued)

FOREIGN PATENT DOCUMENTS

| JP | 3157384 | 4/2001 |
|---|---|---|
| JP | 2001-238231 | 8/2001 |

(Continued)

OTHER PUBLICATIONS

Yamanoue, H.; Okui, M.; Okano, F., "Geometrical analysis of puppet-theater and cardboard effects in stereoscopic HDTV images," Circuits and Systems for Video Technology, IEEE Transactions on, vol. 16, No. 6, pp. 744,752, Jun. 2006.*

(Continued)

*Primary Examiner* — Kim Vu
*Assistant Examiner* — Nathan Bloom
(74) *Attorney, Agent, or Firm* — Wenderoth, Lind & Ponack, L.L.P.

(57) ABSTRACT

A three-dimensional image processing apparatus includes an obtainer that obtains three-dimensional image information including information of a first image and a second image, a shade information obtainer that obtains shade information from the information of the first image and/or the second image, and a disparity adjuster that adjusts a disparity of a subject contained in the first and the second images based on the shade information.

5 Claims, 11 Drawing Sheets

(56) References Cited

U.S. PATENT DOCUMENTS

| | | |
|---|---|---|
| 2007/0195089 A1* | 8/2007 | Furukado .................... 345/426 |
| 2010/0007661 A1* | 1/2010 | Kim et al. .................... 345/419 |
| 2011/0242280 A1 | 10/2011 | Mishima et al. |
| 2012/0039525 A1* | 2/2012 | Tian et al. .................... 382/154 |
| 2012/0050464 A1* | 3/2012 | Chen et al. .................... 348/43 |
| 2013/0010063 A1* | 1/2013 | Redmann ....................... 348/43 |
| 2013/0070052 A1* | 3/2013 | Yamashita et al. .............. 348/43 |
| 2013/0195349 A1* | 8/2013 | Yamashita et al. ............ 382/154 |
| 2013/0294683 A1* | 11/2013 | Yamashita et al. ............ 382/154 |
| 2014/0218488 A1* | 8/2014 | Didyk et al. .................... 348/51 |

FOREIGN PATENT DOCUMENTS

| | | |
|---|---|---|
| JP | 2002-222431 | 8/2002 |
| JP | 3971277 | 9/2007 |
| JP | 2011-215949 | 10/2011 |

OTHER PUBLICATIONS

International Preliminary Report on Patentability and Written Opinion of the International Searching Authority issued Jun. 19, 2014 in International (PCT) Application No. PCT/JP2012/007005.

* cited by examiner

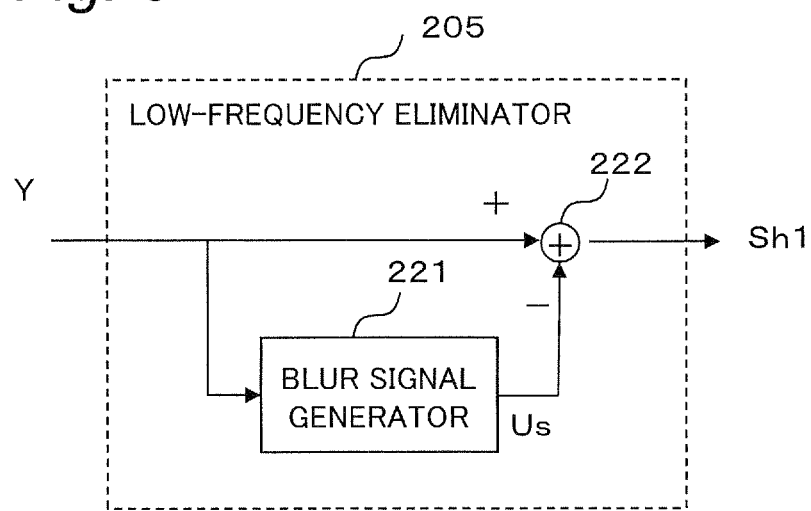
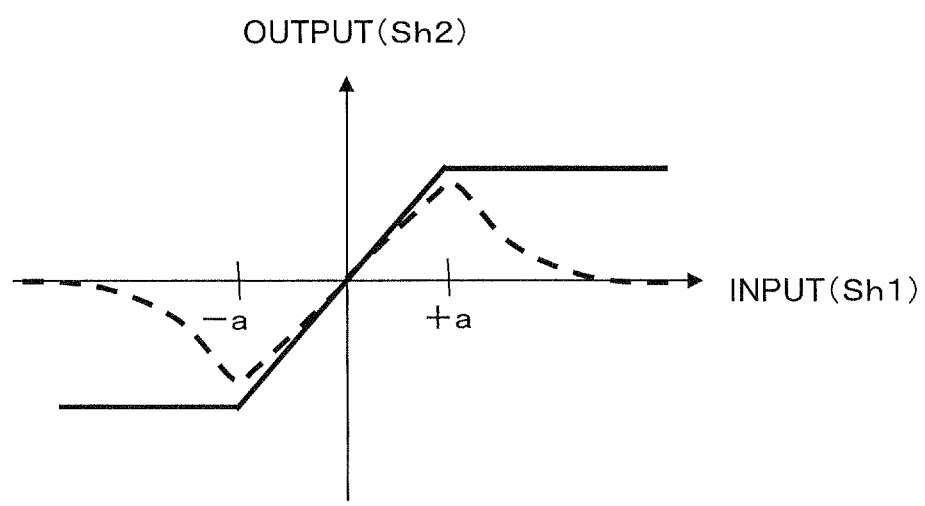

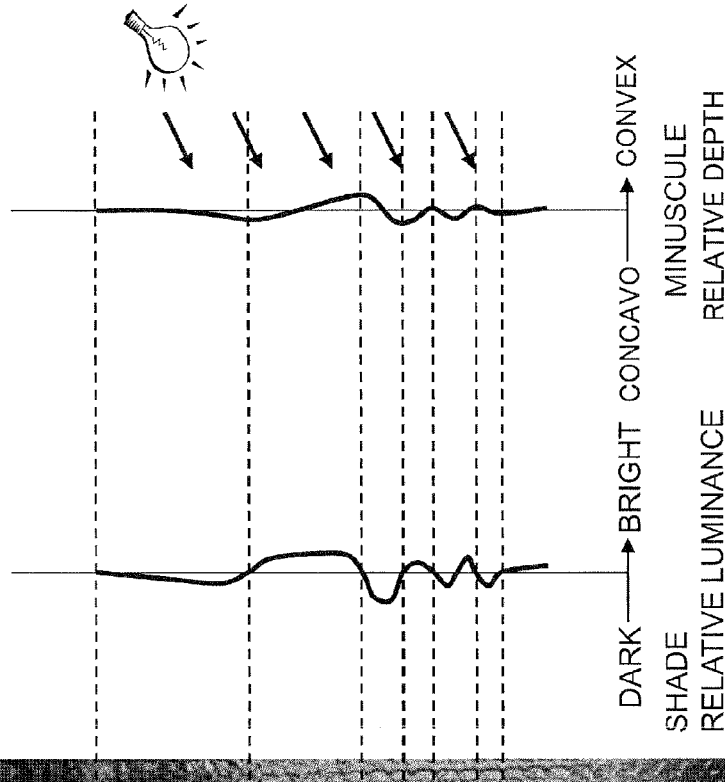
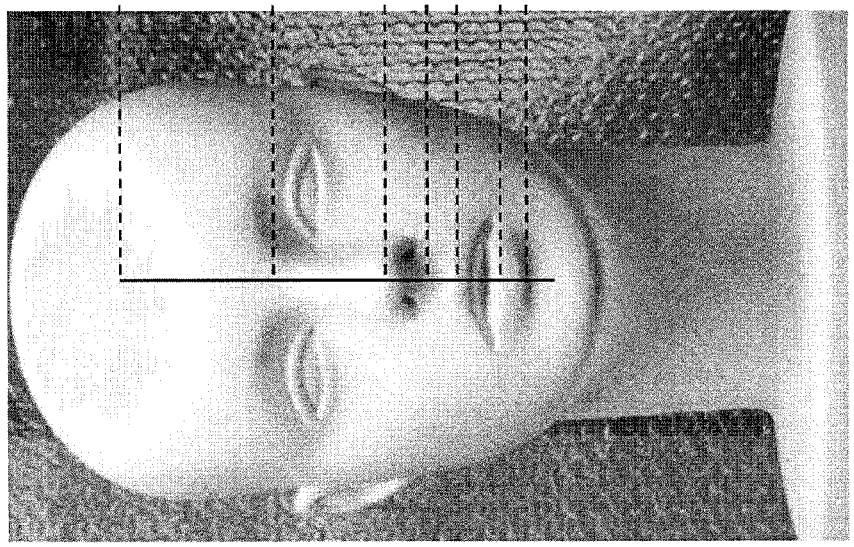
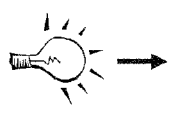

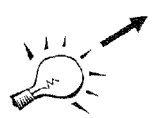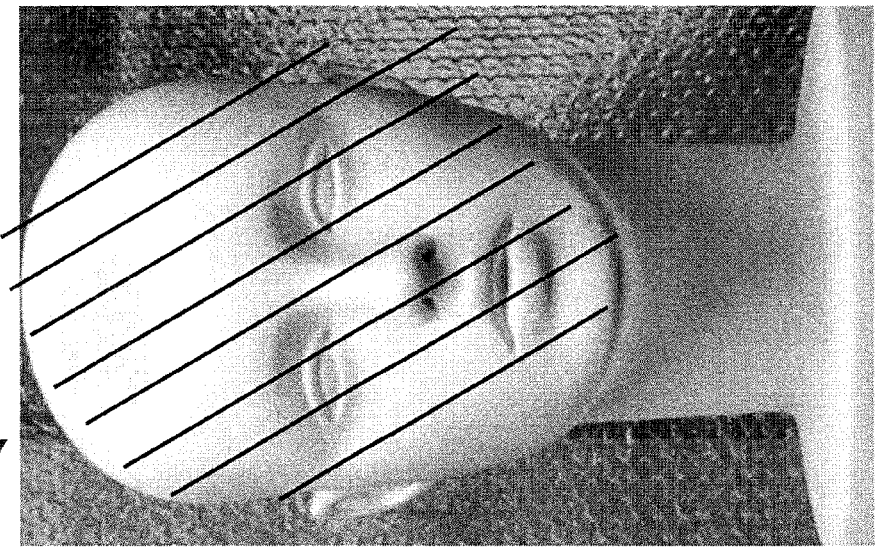
Fig. 7B
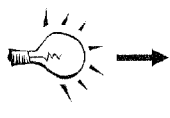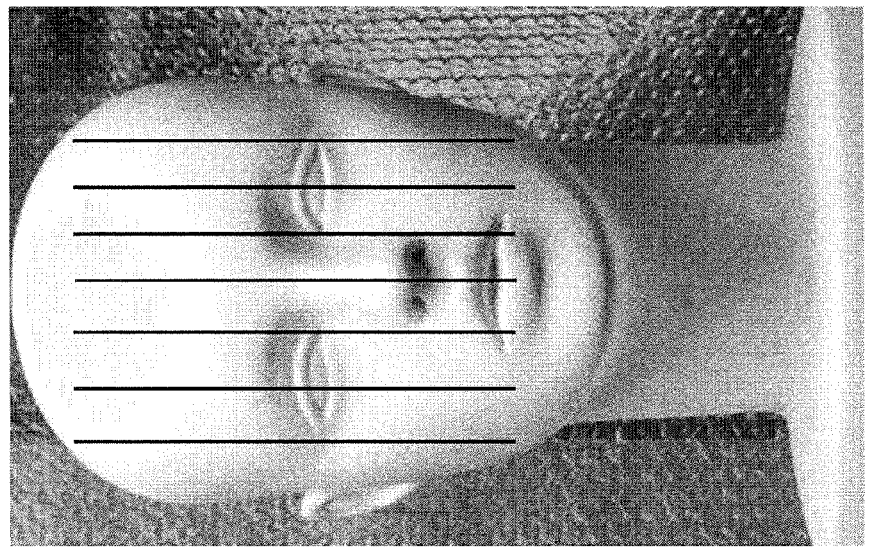
Fig. 7A

THREE-DIMENSIONAL IMAGE PROCESSING APPARATUS AND THREE-DIMENSIONAL IMAGE PROCESSING METHOD

CROSS-REFERENCE TO RELATED APPLICATIONS

This is a continuation application of International application No. PCT/JP2012/007005, with an international filing date of Nov. 1, 2012, which claims priority to Japanese patent application publication No. JP 2011-259063 as filed on Nov. 28, 2011, the content of which is incorporated herein by reference.

BACKGROUND

1. Technical Field

The present disclosure relates to a three-dimensional image processing apparatus which processes a three-dimensional image (three-dimensional stereoscopic image).

2. Related Art

Conventionally, display devices which can present the user with an image for a left eye and an image for a right eye with a parallax to provide a three-dimensional effect for the user (hereinafter, referred to as "three-dimensional image display devices") have been known. The three-dimensional image display devices can provide a three-dimensional effect for the user by showing the left eye and the right eye an image for the left eye and an image for the right eye independently. Conventionally, image capturing apparatuses which can capture a three-dimensional image composed of the image for a left eye and the image for a right eye with a parallax (hereinafter, referred to as "three-dimensional image capturing apparatuses") have also been known.

A three-dimensional image (an image for a left eye and an image for a right eye) which is generated by photographing an image with a large parallax of the background (subject in the background) or the foreground (subject in the foreground) may exceed the fusion limit for a human stereovision, which may be an image hard for the user to perform stereovision or an image causing the user to feel fatigue. In order to avoid generation of a three-dimensional image unfavorable for the user, there is a technique for obtaining a good three-dimensional image by performing parallax adjustment or stereo base adjustment.

The parallax adjustment is a technique mainly used when the background (subject in the background) exceeds the fusion limit. By performing the parallax adjustment to non-linearly compress the distance to the background (subject in the background), the background (subject in the background) which was hard to recognize in stereovision is brought closer, and therefore, a three-dimensional image which is easy for the user to perform stereovision can be generated.

The stereo base adjustment is a technique for adjusting the three-dimensional effect by adjusting the distance between the camera for capturing an image for a left eye and the camera for capturing an image for a right eye (stereo base (base length)). By performing the stereo base adjustment, the dynamic range of the parallax can be made smaller. Therefore, by performing appropriate stereo base adjustment before image capturing, a three-dimensional image can be generated so that entirely from the foreground (subject in the foreground) to the background (subject in the background) is contained in the fusional area.

Further, when a three-dimensional image is displayed in a small-sized display device, the parallax of the three-dimensional image (an image for a left eye and an image for a right eye) becomes smaller, and accordingly, the background is compressed. Therefore, in that case, the three-dimensional image displayed in the small-sized display device is easily recognized.

Making full use of the above described techniques (parallax adjustment and stereo base adjustment) in capturing a three-dimensional image enables capturing of a three-dimensional image which can be easily viewed as a three-dimensional image when a three-dimensional display is performed in a predetermined display environment. For example, in JP 3157384 B1, reducing the parallax from the original value to bring the subject in the fusional area of the stereovision in capturing a three-dimensional image enables capturing of a three-dimensional image which can be easily viewed as a three-dimensional image.

SUMMARY

The technique of JP 3157384 B1 generates a three-dimensional image which can be easily viewed (as a three-dimensional image) by reducing a desired parallax by taking account of the fusion limit of the stereovision. As a result, the three-dimensional image is not desirable in terms of inartificiality of three-dimensional effect and perspective.

Further, although the technique using the parallax adjustment can generate a three-dimensional image which can be easily viewed as a three-dimensional image, the distance to the background (the distance from the position of the image capturing apparatus to the subject in the background) would be non-linearly compressed. Thus, a phenomenon showing the subject in the background flat (cardboard cut-out effect) in the three-dimensional image after subjected to the parallax adjustment.

Further, the technique using the stereo base adjustment lessens perspective as a whole in the generated three-dimensional image. That is, since the distance from the closest point (the position of the subject which is formed closest in the displayed three-dimensional image) to the farthest point (the position of the subject which is formed farthest in the displayed three-dimensional image) is shortened by the stereo base adjustment, a phenomenon lessening the three-dimensional effect on each subject occurs.

Therefore, when the above described conventional techniques are used, the obtained three-dimensional image tends to be a low quality image with poor three-dimensional effect and poor perspective in either case.

The present disclosure provides a three-dimensional image processing apparatus which can provide a high quality three-dimensional image reproduced with inartificial three-dimensional effect.

A first three-dimensional image processing apparatus includes an obtainer that obtains three-dimensional image information including information of a first image and a second image, a shade information obtainer that obtains shade information from the information of the first image and/or the second image, and a disparity adjuster that adjusts a disparity of a subject contained in the first and the second images based on the shade information.

A second three-dimensional image processing apparatus includes an obtainer that obtains three-dimensional image information including a first image and a second image, a disparity detector that determines distance information from the information of the first image and the second image, the distance information including information indicating a disparity between a pixel of the first image and a pixel of the second image corresponding to the pixel of the first image, for each of pixels of the first image, a shade information obtainer that obtains shade information from the information of the first image and/or the second image, an irregularity estimator that determines information on irregularity of a subject contained in the first image and the second image based on the shade information, and a synthesizer that newly determines distance information based on the distance information determined by the disparity detector and the information on irregularity, the newly determined distance information including information indicating a disparity between a pixel of the first image and a pixel of the second image corresponding to the pixel of the first image, for each pixel of the first image.

A first three-dimensional image processing method includes obtaining three-dimensional image information including information of a first image and a second image, obtaining shade information from the information of the first image and/or the second image, and adjusting a disparity of a subject contained in the first and the second images based on the shade information.

A second three-dimensional image processing method includes obtaining three-dimensional image information including information of a first image and a second image, determining distance information from the information of the first image and the second image, the distance information including information indicating a disparity between a pixel of the first image and a pixel of the second image corresponding to the pixel of the first image, for each of pixels of the first image, obtaining shade information from the information of the first image and/or the second image, determining information on irregularity of a subject contained in the first image and the second image based on the shade information, and newly determining distance information based on the distance information previously determined and the information on irregularity, the newly determined distance information including information indicating a disparity between a pixel of the first image and a pixel of the second image corresponding to the pixel of the first image, for each pixel of the first image.

The present disclosure enables a three-dimensional image processing apparatus which can give appropriate parallax information extracted from shade information to an image of poor three-dimensional effect and provide a high quality three-dimensional image to enable reproduction of inartificial three-dimensional effect. The present disclosure also enables a three-dimensional image processing apparatus which provides high quality distance information (information including parallax information between the first and the second images for each pixel) from the three-dimensional image.

Additional benefits and advantages of the disclosed embodiments will be apparent from the specification and drawings. The benefits and/or advantages may be individually provided by the various embodiments and features of the specification and drawings of disclosure, and need not all be provided in order to obtain one or more of the same.

BRIEF DESCRIPTION OF DRAWINGS

FIG. 3 is a diagram illustrating a configuration of a low-frequency eliminator in the shade information obtainer.

FIG. 4 is a diagram illustrating characteristics of a large amplitude eliminator in the shade information obtainer.

FIGS. 5A, 5B, and 5C are diagrams for describing relation between shade of a subject image and minuscule irregularity on the subject.

FIGS. 7A and 7B are diagrams for describing lines (detecting lines) for determining a gray scale level and an irregularity (relative depth).

DETAILED DESCRIPTION

Embodiments will be described below in detail with reference to drawings as required. However, unnecessarily detailed description may be omitted. For example, detailed description about already known matters and redundant description about substantially the same configuration may be omitted. All of such omissions are for facilitating of understanding by those skilled in the art by preventing the following description from being unnecessarily redundant.

Here, the inventor(s) provide the attached drawings and the following description for those skilled in the art to fully understand the present disclosure and does not intend to limit the subject described in the claims by the attached drawings and the following description.

Embodiments of the three-dimensional image processing apparatus according to the present disclosure will be described below with reference to drawings.

First Embodiment

In the first embodiment, a twin-lens three-dimensional image capturing apparatus will be described as an example of the three-dimensional image processing apparatus according to the present disclosure.

1. Three-Dimensional Image Capturing Apparatus

Figure 1:
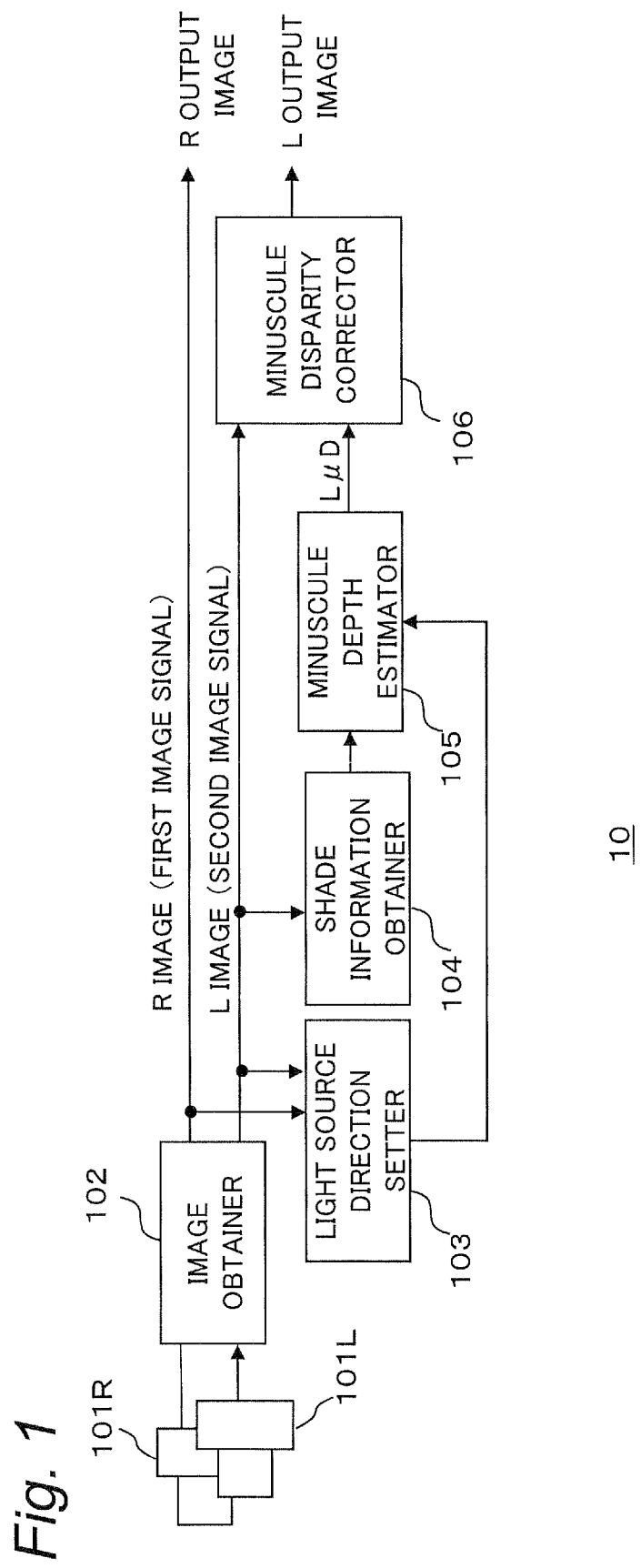
FIG. 1 is a diagram illustrating a configuration of a three-dimensional image capturing apparatus according to a first embodiment.

FIG. 1 illustrates a configuration of a three-dimensional image capturing apparatus according to the first embodiment. The three-dimensional image capturing apparatus is, for example, a digital camera or a video camera capable of capturing a three-dimensional image.

A three-dimensional image capturing apparatus 10 includes a first image capturing unit 101R, a second image capturing unit 101L, an image obtainer 102, a light source direction setter 103, a shade information obtainer 104, a minuscule depth estimator 105, and a minuscule disparity corrector 106.

The first image capturing unit 101R, which is a unit for capturing an image for a right eye, generates a first image signal which is a signal indicating the image for a right eye (hereinafter, referred to as "R image") by capturing a subject from a first viewpoint. The second image capturing unit 101L, which is a unit for capturing an image for a left eye, generates a second image signal which is a signal indicating the image for the left eye (hereinafter, referred to as "L image") by capturing a subject from a second viewpoint. The image obtainer 102 converts the first image signal and the second image signal into digital signal and stores them in a predetermined storage unit (not shown).

The light source direction setter 103 estimates the direction of the light source illuminating a subject from at least either of the first image signal and the second image signal converted into the digital signal and outputs a light source direction value indicating a direction of the light source. The light source direction setter 103 can estimate the direction of the light source by using an average of outputs from a difference filter having directionality of a plurality of directions for the entire screen (for example, see JP 3971277 B1).

Meanwhile, the light source direction setter 103 can also be implemented by the image capturing units 101R and 101L provided with light source sensors. Alternatively, the three-dimensional image capturing apparatus 10 may be adapted to allow the user to set the light source direction by using a user interface or the like. In that case, the light source direction setter 103 can obtain the light source direction value by referring to the set value set by the user. Further, since the light source is usually in the upper part of general photographed scenes, a fixed value indicating the upper part may be set to the light source direction value. The light source direction value may be set at an appropriate predetermined value without being set precisely.

The shade information obtainer 104 obtains shade information (gray scale information) from a captured image. Details of the shade information obtainer 104 will be described later. Although the shade information is obtained from the L image in the present embodiment, the shade information may be obtained from the R image, or may be obtained from both of the R image and the L image.

The minuscule depth estimator 105 estimates minuscule irregularity (minuscule depth) on the surface of an object (photographic subject) contained in an image by using the shade information (gray scale information) obtained by using the shade information obtainer 104 and the value of the light source direction set by the light source direction setter 103 and outputs irregularity information indicating the minuscule irregularity.

The minuscule disparity corrector 106 changes a disparity between the R image (the first image signal) and the L image (the second image signal) by modulating the coordinates of the pixel of the L image (the second image signal) in the right-left direction according to the irregularity by using the irregularity information estimated by the minuscule depth estimator 105 so that a three-dimensional image can be viewed with emphasized irregularity. As a result, the disparity between the image for the right eye and the image for the left eye is emphasized and the irregularity is emphasized. Since the disparity adjustment described here is minuscule, the coordinates is shifted not by one pixel but by the unit of at least 1/10 pixel or less by using interpolation, for example.

The three-dimensional image capturing apparatus 10 with the above described configuration determines information indicating the minuscule irregularity of the object (photographic subject) (minuscule relative depth image) by the shade information obtainer 104 and the minuscule depth estimator 105 based on the shade information of the image. Further, the three-dimensional image capturing apparatus 10 corrects the L image by the minuscule disparity corrector 106 with the information (minuscule relative depth image) to adjust the disparity between the R image and the L image.

Note that, although the disparity modulation is performed on the second image signal by obtaining the shade information and estimating the minuscule depth in the present embodiment, the same processing may be performed on the first image signal instead of the second image signal. Alternatively, the same processing may be performed on both of the first image signal and the second image signal.

2. Irregularity Extracting Operation Based on Shade Information of Image

Extracting operation of minuscule irregularity information of the object (photographic subject) by the shade information obtainer 104 and the minuscule depth estimator 105 based on the shade information of the image will be described.

2.1. Operation of Shade Information Obtainer

Figure 2:
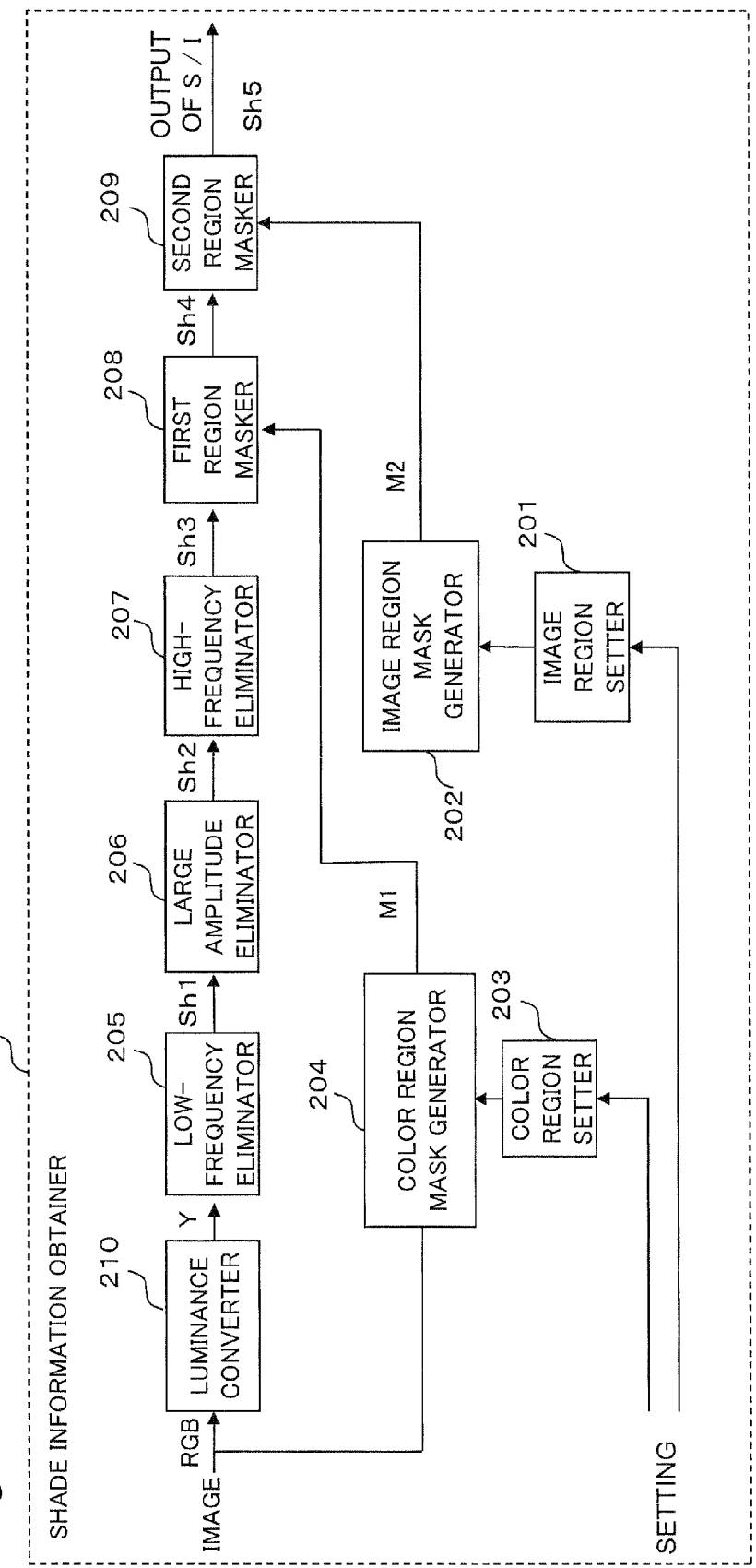
FIG. 2 is a diagram illustrating a configuration of a shade information obtainer in the three-dimensional image capturing apparatus.

FIG. 2 is a block diagram illustrating a detailed configuration of the shade information obtainer 104. The shade information obtainer 104 filters out gray scale information which is not caused by shade from an input image signal and outputs the gray scale information (shade information) which is highly possible to indicate the shade.

The shade information obtainer 104 includes an image region setter 201, an image region mask generator 202, color region setter 203, a color region mask generator 204, a luminance converter 210, a low-frequency eliminator 205, a large amplitude eliminator 206, a high-frequency eliminator 207, a first region masker 208, and a second region masker 209.

In general, an image contains Shade, which differs for the style of lighting up a subject by an illuminating beam, in the gray scale information. The present embodiment will separate and extract only a component caused by the Shade from the gray scale information. However, a real image contains various types of information contributing to brightness other than the component caused by the shade (for example, components caused by the reflectance, difference of color, and the like for each part of the object (photographic subject)). Therefore, it is difficult to separate and extract only the component caused by the Shade. For that reason, the shade information obtainer 104 removes several components which are not considered to be caused by the shade so as to extract more precisely components (shade information) which are caused by the shade.

First, the luminance converter 210 generates a luminance signal (Y) from the pixel values (RGB signal) of the input image.

The low-frequency eliminator 205 filters out the low frequency components (components which have frequency lower than a predetermined first frequency) from the luminance signal (Y) output by the luminance converter 210. FIG. 3 illustrates an exemplary configuration of the low-frequency eliminator 205. The low-frequency eliminator 205 includes a blur signal generator 221 and a subtractor 222. The blur signal generator 221 extracts only low-frequency components from the luminance signal (Y) to generate the blur signal (Us). The subtractor 222 removes the low-frequency components from the luminance signal (Y) by subtracting the blur signal (Us) from the luminance signal (Y). That is, the low-frequency eliminator 205 composes a two-dimensional high-pass filter as a whole.

The low-frequency eliminator 205 functions to extract not the absolute value of the luminance but the changed portion of the luminance. On the condition that a value of the low-frequency cutoff (F1) is properly set in the blur signal generator 221, the low-frequency eliminator 205 functions to extract the shade components (Sh1) which is considered to be caused by the irregularity of the surface of the object (photographic subject) by separating gentle variation of the luminance in a large area due to uneven illumination of the illuminating beam.

The large amplitude eliminator 206 eliminates components of the amplitude larger than a predetermined value from the shade components (Sh1) output by the low-frequency eliminator 205. The functions of the large amplitude eliminator 206 will be described.

Effects of the color components or object (photographic subject) having the color components still remain in the shade components (Sh1) output by the low-frequency eliminator 205. Generally, the shade components due to the irregularity on the surface of the object (photographic subject), the shade components of which are desired to be extracted, do not have so large difference (or ratio) between their bright components and dark components. When the shade components has a large luminance difference, it is highly possible that the object (photographic subject) contains another object having large reflectance (or different color) (for example, such a case as a black belt of a shoulder bag traverses a region of uniformly grey colored shirt). As a result, the present embodiment removes the components which give a large luminance difference. According to that idea, the components which are highly possible not to be contained in the actual shade components are removed by the large amplitude eliminator 206.

FIG. 4 illustrates an example of input-output characteristics of the large amplitude eliminator 206. The abscissa indicates an input to the large amplitude eliminator 206, i.e., the shade information (Sh1) output from the low-frequency eliminator 205. The ordinate indicates an output from the large amplitude eliminator 206, i.e., the shade information (Sh2) which is the result of removing large amplitude components from the shade information (Sh1). Since a low frequency component is cut, the input signal takes the value 0 in a range where there is no change. The range from −a to +a in the figure is the range of the variation of luminance represented by the actual shade. The solid line in the figure indicates a first example of the input-output characteristics, which limits the components outside of the range of the actual shade (−a to +a). That characteristic can prevent the variation of the luminance due to factors other than the shade from influencing much greater than that caused by the shade. The dashed line in the figure indicates a second example of the input-output characteristics, which is the characteristic for more positively removing the large amplitude components. The variation of the luminance (components) which largely exceed the variation of the luminance caused by the shade is removed. Specifically, the large amplitude eliminator 206 can be implemented by an LUT (lookup table), a piecewise linear circuit, or the like.

Meanwhile, the blur signal generator 221 may be adapted to have the characteristics of the edge preserving low-pass filter to remove the components caused by large reflectance different from the actual shade in the low-frequency eliminator 205. A bilateral filter and an epsilon filter are well-known edge preserving low-pass filters, but the edge preserving low-pass filter is not limited to them. Any filter may be used as far as the filter has the characteristics in which the cut-off frequency (F1) increases (does not shade off) when the variation of the luminance is large such as edge and the cut-off frequency (F1) decreases (shades off) when the variation of the luminance is small. When the above described characteristics is given to the blur signal generator 221 in the low-frequency eliminator 205, a signal with large variation would be included in the blur signal (Us) as it is without being blurred, therefore, the signal would be removed by the subtractor 222.

Referring to FIG. 2 again, the high-frequency eliminator 207 filters out the high-frequency components (components which have a frequency higher than a predetermined second frequency) from the above described shade information (Sh2). The actual shade tends to slightly blur instead of being a clear shade due to the blend of lights caused by the light spread from a point source of light or a plurality of light sources (including an indirect light reflected from various bodies). Consequently, it may be highly possible that the high frequency components in the gray scale information is not caused by the shade, therefore, the present embodiment removes the high frequency component.

The color region setter 203 sets a color range of the object (photographic subject) from which the shade information is desired to be extracted, i.e., a range of the targets of the shade information extraction. The color region setter 203 may set the color range based on the operator's specification or may automatically set based on the distribution of colors contained in the image.

The color region mask generator 204 generates mask information (M1) for excluding pixels of colors which are not contained in the set color range from the targets of the shade information extraction based on the color range set by the color region setter 203. In order to extract the shade correctly, a region in which colors and reflectance are uniform as much as possible needs to be specified. Therefore, the present embodiment excludes a region in which colors and reflectance vary more than a predetermined levels from the targets of the shade information extraction. For example, when the pale orange of a person's face color is specified by the color region setter 203, the color regions of eyebrows, eyes, hairs, and the like which are outside of the color region of the pale orange are excluded from the targets of the shade information extraction. For that purpose, the color region mask generator 204 excludes colors different from the color of the object of the processing from the targets of the processing.

Meanwhile, even in the object of the same body color, the RGB values for the image may differ for the lighting up condition or the shade. However, since the RGB values are for the same body color of the same object, the RGB values need to be included in the targets of the processing. Therefore, evaluation of color region may be performed by excluding the variation of colors due to the intensity of the lighting. For example, the RGB signal is converted into the luminance color difference signal (Y, Cb, Cr, or the like), or the L*, a*, and b* signal or the L*, u*, and v* signal in the uniform color space so that evaluation is performed only on the chromaticity value with luminance excluded.

Specific examples of scores E1 to E3 for color conversion will be described below.

$$E1 = (Cb - Cb_0)^2 + (Cr - Cr_0)^2 \quad \text{[Expression 1]}$$

$$E2 = \sqrt{(a^* - a_0^*)^2 + (b^* - b_0^*)^2} \quad \text{[Expression 2]}$$

$$E3 = |u^* - u_0^*| + |v^* - v_0^*| \quad \text{[Expression 3]}$$

Any of the evaluation scores are evaluated by using differences (color difference) between the colors specified by the color region setter 203 (Cb0, Cr0, a0*, b0*, u0*, and V0*) and the colors of the input image (Cb, Cr, a*, b*, u*, and V*). Here, as typical index of color difference, a square of the distance difference on the chromaticity plane (E1), a distance on the chromaticity plane (E2), the sum of the distance in the x-direction and the distance in the y-direction (E3) are exemplified. Therefore, the color region mask signal (M1) is evaluated by using the above described scores E1, E2, or E3. When the evaluation score is larger than a predetermined maximum level, the color region mask signal (M1) is set to the value of 255 and when the evaluation score is smaller than a predetermined minimum level, the color region mask signal (M1) is set to the value of zero. Here, the expression for determining the evaluation score is not limited to the above equation and any functions may be used as far as the function provides a larger value as the color of the input image is closer to the specified color. In any cases, when the light quantity or the shade changes and, accordingly, the luminance changes, it only needs to generate the mask signal which is hardly influenced by that change.

The first region masker 208 masks a region other than the region of the color specified by the operator. When the value of the color region mask signal (M1) is 255, the first region masker 208 lets the input shade information (Sh3) pass with the gain unchanged, and when the value of the color region mask signal (M1) is zero, the first region masker 208 blocks the input shade information (Sh3). The first region masker 208 may be implemented by using a multiplier or the like. The first region masker 208 can remove the incorrect shade information in the color range outside of the specified color region.

The image region setter 201 sets a range of the image region of the object from which the shade information is extracted, according to the instruction of the user. That is, the user sets a range of the image region of the object from which the user intends to extract the shade information. The user can set the range of the image region of the object from which the user intends to extract the shade information, by specifying an object or a region, or by specifying a screen area resulting from block division, or by specifying a color or luminance, or by specifying the range of a disparity in performing the stereovision (range of depth) by using a user interface, for example. Alternatively, the range of the image region may be specified without using a user interface. Alternatively, the range of the image region may be specified by such automatic person detection which uses automatic detection of a specific object, face recognition, or person recognition. That is, any method can be used as far as the method consequently allows specification of a region of the image. On that occasion, for example, the user to select and set a region in which colors and reflectance are uniform as much as possible in the object.

The color region mask generator 202 generates an image region mask signal (M2) for removing the region outside of the image region set by the image region setter 201 from the targets of the processing. The image region mask generator 202 outputs a binary mask signal, which takes the value one for a pixel within the image region set by the image region setter 201 and takes the value zero for the region outside of the set image region, as the image region mask signal (M2). Alternatively, the image region mask generator 202 may output multivalued mask information like the alpha channel, which takes the value 255 in the set image region and takes the value zero in the region outside of the set image region and has the value gently varying in the vicinity of the boundary of the regions, as the image region mask signal (M2). Alternatively, the image region mask generator 202 may generate an image region mask signal by using the coordinate value of a control point of a polygon, B-spline, Bezier Function, or the like. Any signal may be used for the image region mask signal (M2) as far as the signal can practically indicate a specific region in an image.

The second region masker 209 masks a region other than the region specified by the user via the image region setter 201. When the image region mask signal (M2) is one, the second region masker 209 lets the input shade information (Sh4) pass with the gain unchanged, and when the color region mask signal (M2) is zero, the second region masker 209 blocks the input shade information (Sh4). The second region masker 209 may be implemented by a multiplier or the like. The second region masker 209 can remove the unintended shade information which is within a range of coordinates outside of the image region set by the image region setter 201.

2.2. Operation of Minuscule Depth Estimator

Figure 6:
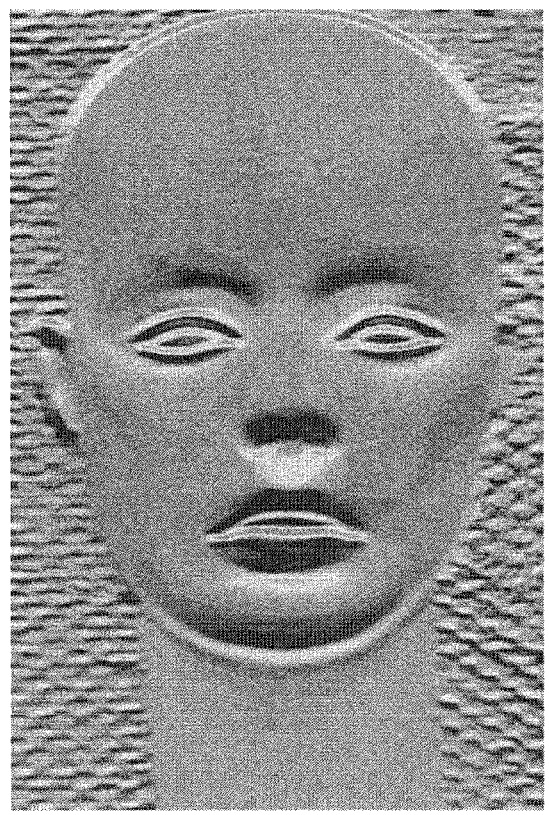
FIG. 6 is a diagram for describing information indicating irregularity output from a minuscule depth estimator.

FIGS. 5A, 5B, and 5C are diagrams for describing the operation of the minuscule depth estimator 105 (see FIG. 1) of the three-dimensional image capturing apparatus 10. FIG. 5A shows a gray scale image (image only of luminance) of a subject made of plaster. The subject illustrated in FIG. 5A is photographed by lighting up the subject from above at the front of the subject. FIG. 5B is a diagram illustrating the luminance level at the vertical line part in the center of the gray scale image. FIG. 5C is a diagram illustrating the irregularity (relative depth) at the vertical line part in the center of the gray scale image. The minuscule depth estimator 105 outputs information indicating the irregularity (relative depth) as illustrated in FIG. 6 with respect to the gray scale image shown in FIG. 5A.

The lines for determining a gray scale level and a irregularity (relative depth) (hereinafter, referred to as "detection lines") are decided according to the position of the light source. For example, as shown in FIG. 7A, when the subject is photographed as it is lit up from above at the front of the subject, lines, which are parallel to the direction of the straight line interconnecting the light source and the center of the subject, are set as the detection lines. On the other hand, as shown in FIG. 7B, when the light source is diagonally above the subject, the detection lines are set in the diagonal direction according to the light source direction.

Since the subject shown in FIG. 5A is made of plaster which entirely has an equal reflectance, the luminance of the object appearing in the gray scale image is the result of the shade caused by the lighting up of the irregularity (relative depth) of the subject surface from the upward front of the subject. The area where the light source direction is orthogonal to the surface of the subject (see FIG. 5C) receives more beams than the other area by the unit area, which is why the area is brighter than the other area (see FIG. 5B). As the angle between the light source direction and the surface of the subject is shallower, the image is darker. Conversely, it can be seen that the area where the luminance is intensified in FIG. 5B corresponds to the area in FIG. 5C where the angle between the surface of the subject and the light source direction is near to a right angle.

Figures 8A, 8B:
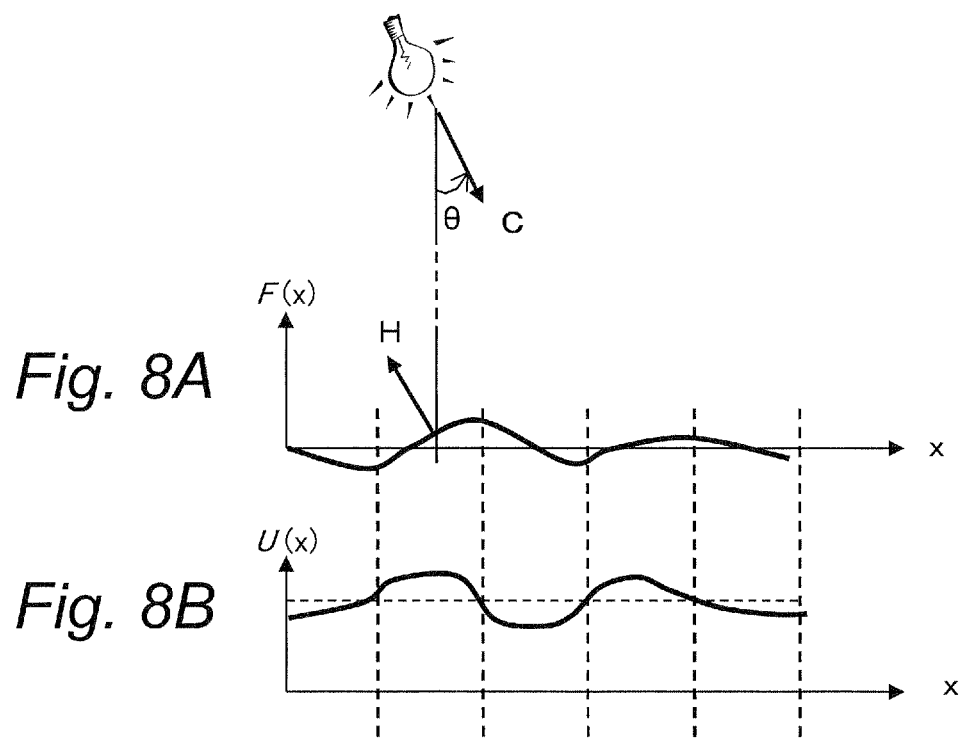
FIGS. 8A and 8B are diagrams for describing relation between variation in irregularity of the subject (F(x)) and variation in brightness (U(x)).

FIG. 8 is a diagram for describing the relation between the irregularity and the luminance. As described above, the abscissa of the graph shown in FIGS. 8A and 8B indicate the coordinate axis in the direction along the light source direction set by the light source direction setter 103. The ordinate of the graph shown in FIG. 8A indicates the value F(x) of irregularity (relative depth) along a detection line. The ordinate of the graph shown in FIG. 8B indicates the value U(x) of luminance along a detection line.

As a parameter for the light source, the angle $\theta$ between the subject and the light source is set. When $\theta=0$, the light source is right in front of the subject, the subject is lit up from the directly opposite side, and thus no shade is made. When $\theta$ is too large, the shadow lengthens too long, and thus it is difficult to separate the shadows of respective shapes of the irregularity. However, since the minuscule irregularity on the surface of the subject, the target of the detection in the present embodiment, has a small amplitude, the allowed range for $\theta$ is widened so that it is even possible to fix $\theta$ to 30 degrees.

As shown in FIGS. 8A and 8B, the normalized light source is represented by the unit light source vector C, and the perpendicular direction to the surface of irregularity of the subject is represented by the unit normal vector H.

$$C = (\sin\theta, -\cos\theta) \qquad \text{[Expression 4]}$$

$$H = \frac{1}{\sqrt{F'(x)^2 + 1}} \cdot (-F'(x), 1) \qquad \text{[Expression 5]}$$

Here, the luminance U(x) of the surface is expressed by the expression below.

$$U(x) = -H \cdot C \qquad \text{[Expression 6]}$$

From the above three expressions, the following expression is obtained, from which it is understood that the luminance U(x) of the surface is decided from the light source direction and the irregularity of the surface.

$$U(x) = \frac{\sin\theta \cdot F'(x) + \cos\theta}{\sqrt{F'(x)^2 + 1}} \qquad \text{[Expression 7]}$$

With respect to the minuscule irregularity of the subject surface, since F'(x) is smaller than one, U(x) can be further approximated as below.

$$U(x) \approx \sin\theta \cdot F'(x) + \cos\theta \qquad \text{[Expression 8]}$$

The minuscule depth estimator 105 determines F(x) from U(x) by using the following expression.

$$F(x) \approx \int \frac{U(x) - \cos\theta}{\sin\theta} dx \qquad \text{[Expression 9]}$$

For example, assuming that the irregularity variation can be represented by a simple trigonometric function, the irregularity variation can be further simply determined by differentiation as shown by the following expression.

$$F(x) = k \cdot \sin(n \cdot x) \qquad \text{[Expression 10]}$$

Here, k is the amplitude of the irregularity and n is the pitch of the irregularity.

The luminance (U(x)) of the surface of the object is determined by the following expressions.

$$U(x) \approx n \cdot k \cdot \sin\theta \cdot \cos(n \cdot x) + \cos\theta \qquad \text{[Expression 11]}$$

$$F(x) = -\frac{1}{n^2 \cdot \sin\theta} U'(x) \qquad \text{[Expression 12]}$$

As described above, the irregularity information (F(x)) can be determined from the luminance information (U(x)) by differentiation and integration. According to the idea of the first embodiment, shade is extracted from a gray scale image. Then minuscule irregularity on the surface of a subject is determined from the shade without regard to the light source direction. Then disparity of the three-dimensional image is corrected for each pixel by using the determined minuscule irregularity, thereby a high quality three-dimensional image can be achieved with highlighted irregularity which is poor in the original image when it is viewed as the three-dimensional image.

Meanwhile, since a minuscule relative disparity does not influence the range of the disparity of the entire scene of the three-dimensional image, the minuscule relative disparity never makes the stereovision of the image difficult.

Also, since the minuscule relative disparity does not change the luminance or contrast of an image, the minuscule relative disparity does not cause degradation of image quality due to gray overflow and color saturation.

Although the three-dimensional image capturing apparatus 10 of the present embodiment has the image capturing units 101R and 101L, the three-dimensional image capturing apparatus 10 may not include these image capturing units. The three-dimensional image capturing apparatus 10 only needs to have a configuration capable of obtaining the three-dimensional image information in place of the image capturing units.

Although an example in which image signals (the first image signal and the second image signal) indicating an image captured from two viewpoints (the first viewpoint and the second viewpoint) are used is described in the present embodiment, the idea of the present embodiment is not limited to that. When images captured from three or more viewpoints compose a three-dimensional image, the idea of the present embodiment can be applied to the image signals indicating images captured from viewpoints adjacent to each other.

3. Conclusion

As described above, the three-dimensional image processing apparatus 10 according to the present embodiment includes an the image obtainer 102 that obtains three-dimensional image information including information of a R image and a L image, a shade information obtainer 104 that obtains shade information from the information of the R image and/or the L image, and a disparity adjuster (the minuscule disparity corrector 106) that adjusts a disparity of a subject contained in the R and the L images based on the shade information.

With that configuration, the three-dimensional image processing apparatus 10 of the present embodiment can enhance the three-dimensional effect of an object (photographic subject) of poor three-dimensional effect by determining information indicating minuscule irregularity of the object (photographic subject) (minuscule relative depth image) based on the shade information and using the information to adjust the disparity of the object (photographic subject) contained in the three-dimensional image. As a result, an inartificial three-dimensional effect with reduced cardboard cut-out effect can be reproduced, thereby improving the quality of the three-dimensional image.

Further, in the three-dimensional image processing apparatus 10, the shade information obtainer 104 may include a low-frequency eliminator 205 that eliminates predetermined low-frequency components from the information of the R image and/or the L image, and the shade information obtainer may obtain the shade information based on the information of the image of which predetermined low-frequency components are eliminated. Eliminating the predetermined low-pass components enables the three-dimensional image processing apparatus 10 to separate gentle variation of the luminance in a large area due to uneven illumination of the illuminating beam and extract the shade components which are considered to be caused by the irregularity of the surface of the object (photographic subject).

Further, the shade information obtainer 104 may further include a large amplitude eliminator 206 that further eliminates components exceeding predetermined amplitude from the information of the image of which predetermined low-frequency components are eliminated, and the shade information obtainer 104 may obtain the shade information based on the information of the image of which components exceeding the predetermined amplitude are eliminated. By eliminating the component exceeding the predetermined amplitude, the influence of another object of large reflectance (or different color) contained in the object (photographic subject) on the shade information can be excluded.

The shade information obtainer 104 may further include the high-frequency eliminator 207 that further eliminates predetermined high-frequency components from the information of the image of which components exceeding the predetermined amplitude are eliminated, and the shade information obtainer 104 may obtain the shade information based on the information of the image of which high-frequency components are eliminated. By eliminating the predetermined high-pass component, the components which are not caused by the shade can be excluded more precisely from the shade information.

The disparity adjuster may further includes an irregularity estimator (minuscule depth estimator 105) that determines information on irregularity of the subject contained in the R image and the L image based on the shade information, and the disparity adjuster may adjust the disparity based on the information on irregularity. By grace of the irregularity estimator, the information on the irregularity of the subject can be determined based on the shade information.

Second Embodiment

In the second embodiment, a three-dimensional image capturing apparatus that can generate a highly precise distance image from a three-dimensional image containing the R image and the L image will be described. Here, the distance image is an image which has information indicating a disparity between the R image and the L image for each pixel. The disparity corresponds to the distance from the reference position (position on the display surface) of a three-dimensionally displayed image (pixel) Therefore, the distance image can also be expressed as an image which has the distance from the reference position (position on the display surface) of a three-dimensionally displayed image (pixel) for each pixel.

Figure 9:
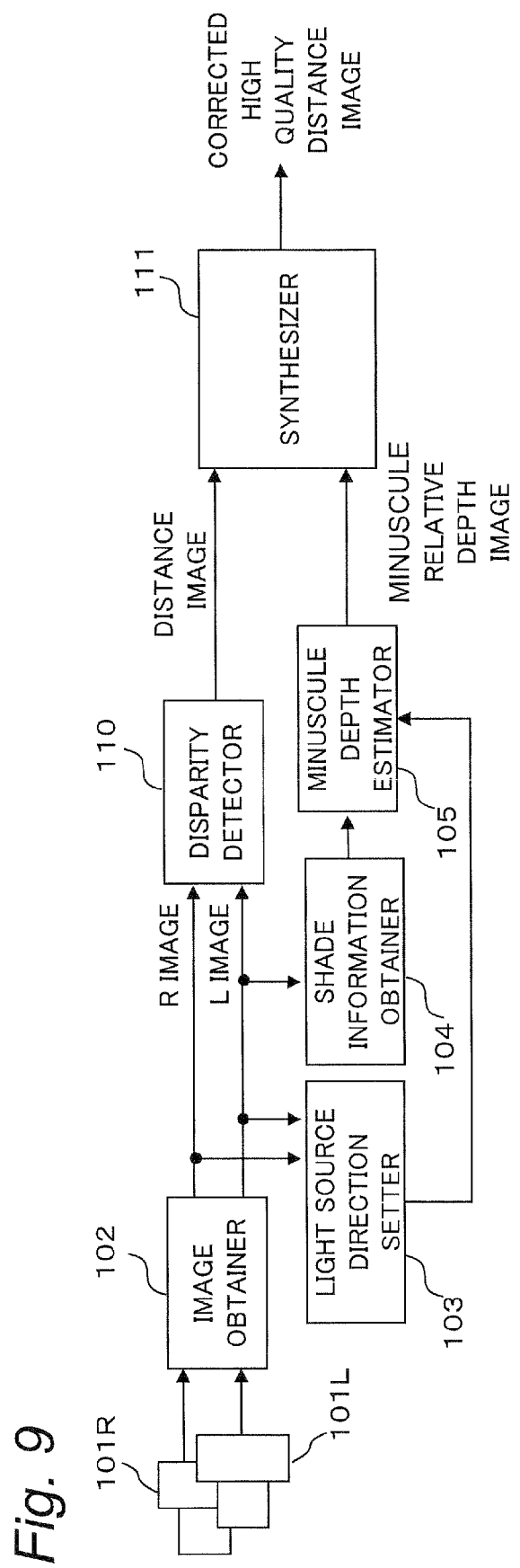
FIG. 9 is a diagram illustrating a configuration of the three-dimensional image capturing apparatus according to a second embodiment.

FIG. 9 illustrates a configuration of the three-dimensional image capturing apparatus of the second embodiment. A three-dimensional image capturing apparatus 50 of the second embodiment includes a first image capturing unit 101R, a second image capturing unit 101L, an image obtainer 102, an light source direction setter 103, a shade information obtainer 104, and a minuscule depth estimator 105 as the three-dimensional image capturing apparatus 10 of the first embodiment does. Further, the three-dimensional image capturing apparatus 50 of the present embodiment includes a disparity detector 110 and a synthesizer 111.

The first image capturing unit 101R, the second image capturing unit 101L, the image obtainer 102, the light source direction setter 103, the shade information obtainer 104, and the minuscule depth estimator 105 perform the same operations as those described in the first embodiment, thus the description of them will be omitted here.

The disparity detector 110 generates the distance image, by using a first image signal which indicates the image (the R image) captured from a first viewpoint by the first image capturing unit 101R and a second image signal which indicates the image (the L image) captured from a second viewpoint by the second image capturing unit 101L, by performing processing of determining a disparity between the images for each pixel. The distance image generated in that manner is a rough distance image having low resolution and small number of levels.

The minuscule depth estimator 105 outputs information indicating the irregularity (relative depth) as illustrated in FIG. 6. The information output from the minuscule depth estimator 105 is information which indicates high-quality, relative and minuscule irregularity estimated from the shade (luminance) of the image.

The synthesizer 111 adds the high-quality irregularity information output from the minuscule depth estimator 105 to the distance image output from the disparity detector 110. That is, the synthesizer 111 synthesizes the distance image output from the minuscule depth estimator 105 to the distance image output from the disparity detector 110 and, based on the result, generates a corrected distance image. The depth image generated in that manner is a high quality distance image.

Figure 10:
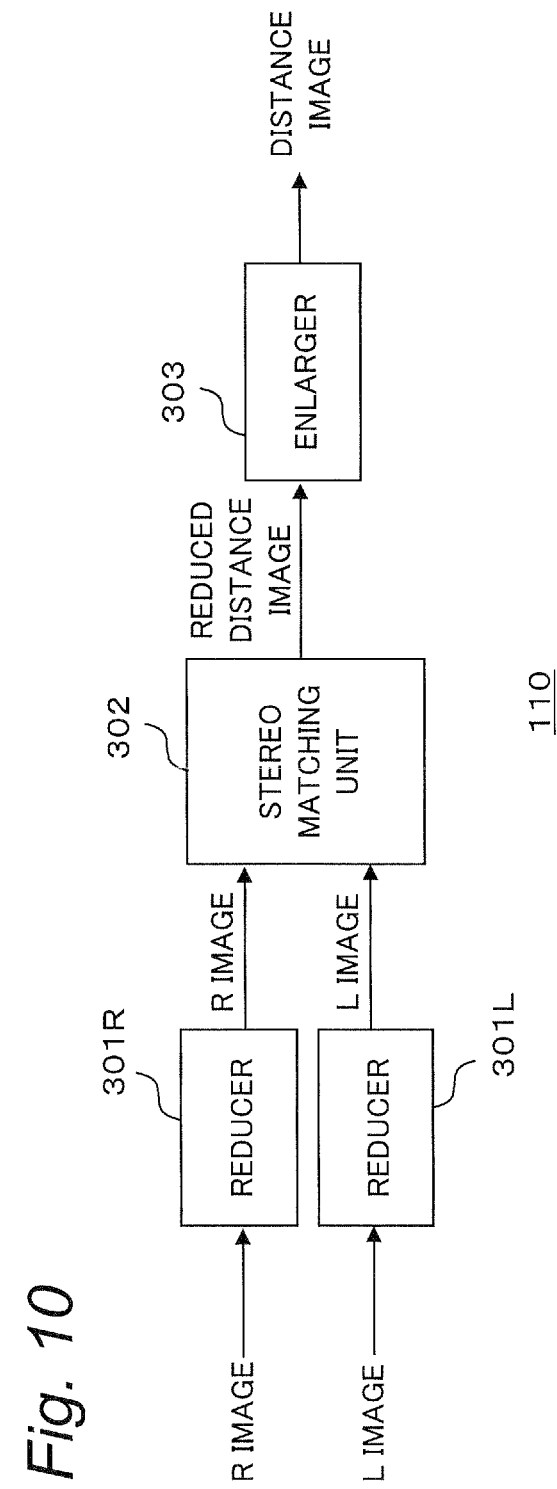
FIG. 10 is a diagram illustrating a configuration of a disparity detector in the three-dimensional image capturing apparatus.

FIG. 10 is a diagram illustrating a configuration of the disparity detector 110. The disparity detector 110 includes first and second reducers 301R and 301L, a stereo matching unit 302, and an enlarger 303.

In order to reduce the computation effort, the first and second reducers 301R and 301L reduce the respective images (the R image and the L image) indicated by the first image signal and the second image signal to images of the QVGA (302×240) resolution.

The stereo matching unit 302 detects a disparity by examining correlation between the R image and the L image reduced by the first and second reducers 301R and 301L for each pixel and generates an image having disparity information (hereinafter, referred to as "reduced distance image") for each pixel. Details of the processing will be described later.

The enlarger 303 generates the distance image by enlarging (for example, interpolating) the reduced distance image output from the stereo matching unit 302 to have the same resolution as the original image.

Figure 11:
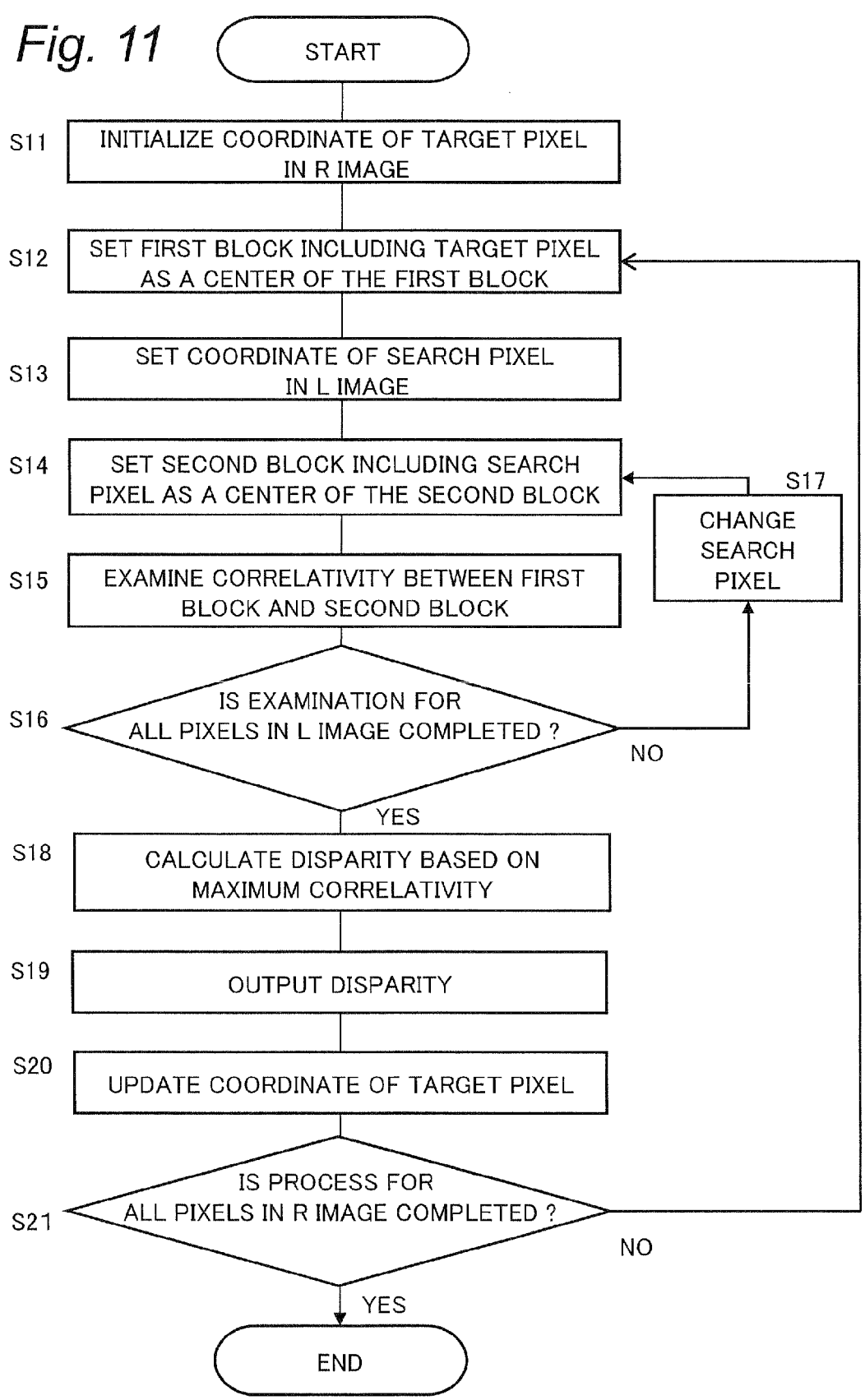
FIG. 11 is a flowchart describing operation of a stereo matching unit.

Detailed operation of the stereo matching unit 302 will be described with reference to the flowchart shown in FIG. 11.

First, the stereo matching unit 302 sets a target pixel to be examined first in the R image indicated by the first image signal (S11). Specifically, the stereo matching unit 302 initializes the coordinates of the target pixel in the R image. Then, the stereo matching unit 302 sets a first block containing 8×8 pixels including the target pixel as the center of the first block (S12). In the L image, the stereo matching unit 302 sets a reference pixel to be first compared with the target pixel (S13) and sets a second block containing 8×8 pixels including the reference pixel as the center of the second block (S14). For the all pixels between the first block and the second block, the stereo matching unit 302 determines the square of a difference of pixel values between the corresponding pixels, and determines the total value of them as an evaluation value for the correlatively (S15). Thereafter, the stereo matching unit 302 determines the evaluation value as described above (S15) with the reference pixel in the L image changing (S17). This processing is continued until the all pixels (reference pixels) in the L image are examined (steps S14 to S17).

Next, the stereo matching unit 302 decides the reference pixel which has the maximum correlation value of the plurality of correlation values determined for the plurality of second blocks, and determines the disparity (depth value) from the difference between the positions of the decided reference pixel and the target pixel (S18), and outputs the determined disparity (depth value) (S19).

Thereafter, the above described processing is performed (steps S12 to S20) to determine the disparity (depth value) for the all pixels in the R image (S21) with the coordinates of the target pixel changing (S20).

Figure 12:
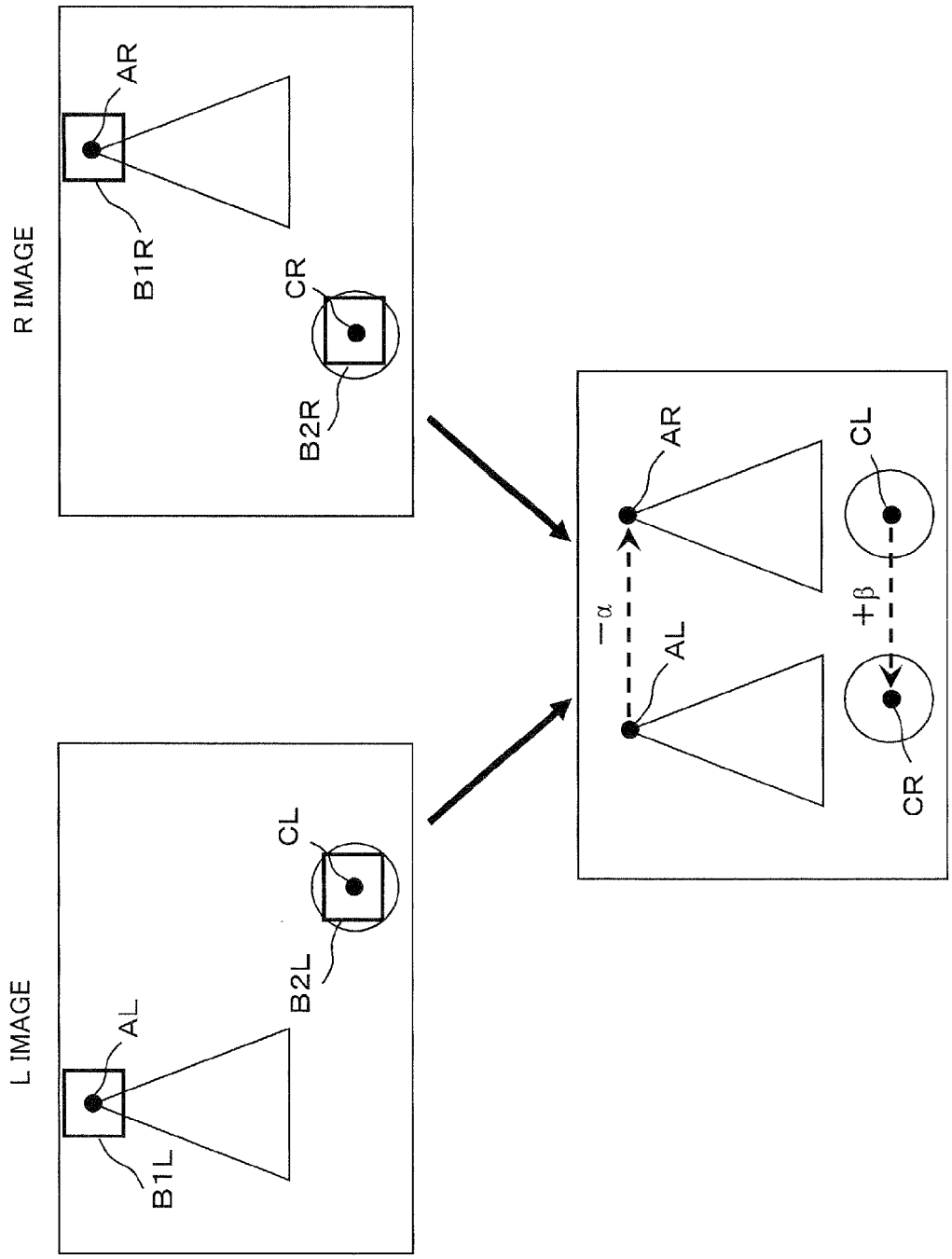
FIG. 12 is a diagram for describing block matching by the stereo matching unit.

FIG. 12 is a diagram illustrating the block matching between the R image and the L image performed by the stereo matching unit 302. When the correlatively is high between the first block B1R containing the target pixel AR and the second block B1L containing the reference pixel AL, −α is determined as the disparity (depth value) for the pixel AR. Further, when the correlatively is high between the first block B2R containing the target pixel CR and the second block B2L containing the reference pixel CL, +β is determined as the disparity (depth value) for the pixel CR.

In the above described manner, the stereo matching unit 302 generates the reduced distance image from the reduced R image and the reduced L image. Here, since the accuracy of detecting the depth lowers for a flat region, the stereo matching unit 302 may perform repair processing (compensation processing) on the disparity.

As described above, the three-dimensional image processing apparatus 50 of the present embodiment includes the image obtainer 102 that obtains three-dimensional image information having the R image and the L image, the disparity detector 110 that determines the distance image (distance information) from the information of the R image and the L image, the distance image (distance information) including information indicating a disparity between a pixel of the R image and a pixel of the L image corresponding to the pixel of the R image, for each of pixels of the R image, the shade information obtainer 104 that obtains shade information from the information of the R image and/or the L image, the minuscule depth estimator 105 that determines information on irregularity of an object (photographic subject) (minuscule relative depth image) contained in the R image and the L image based on the shade information, and the synthesizer that newly determines distance image (distance information) based on the distance image (distance information) determined by the disparity detector 110 and the information on irregularity (minuscule relative depth image), the newly determined distance image (distance information) including information indicating a disparity between a pixel of the R image and a pixel of the L image corresponding to the pixel of the R image, for each pixel of the R image.

As such, the three-dimensional image capturing apparatus 50 of the present embodiment can obtain more high quality distance image by determining information indicating minuscule irregularity of the object (photographic subject) (minuscule relative depth image) based on the shade information of the image and by using the determined information to correct the distance image containing a disparity between the images for each pixel.

Here, the respective units of the three-dimensional image capturing apparatuses 10 and 50 described in the first and second embodiments may be implemented by hardware such as electronic circuits or may be implemented by cooperation of a microcomputer with a software such as a program executed in the microcomputer. Alternatively, the respective units of the three-dimensional image capturing apparatuses 10 and 50 may be implemented by one semiconductor integrated circuit or may be implemented by a plurality of semiconductor integrated circuits.

The embodiments is described above as examples of the technology of the present disclosure. For those purposes, the accompanying drawings and the detailed description is provided. Therefore, the constituent elements shown and described in the accompanying drawings and the detailed description may include not only the constituent element necessary to solve the problem but also the constituent element unnecessary to solve the problem for the purpose of exemplifying the above described technology. Accordingly, it should not be instantly understood that these unnecessary constituent elements are necessary since these unnecessary constituent elements are shown or described in the accompanying drawings and the detailed description. Since the above described embodiments are for exemplifying the technology in the present disclosure, the embodiments may be subject to various kinds of modification, substitution, addition, and omission without departing from the scope of the claims and their equivalents.

The idea provided by the present disclosure can give appropriate disparity to an image of poor three-dimensional effect to enable reproduction of inartificial three-dimensional effect, thus is useful for a three-dimensional image processing apparatus.

What is claimed is:

1. A three-dimensional image processing apparatus comprising:
   an obtainer that obtains three-dimensional image information including information of a first image and a second image;
   a shade information obtainer that obtains shade information from the information of the first image and/or the second image; and
   a disparity adjuster that adjusts a disparity of a subject contained in the first and the second images based on the shade information, wherein
   the shade information obtainer comprises a low-frequency eliminator that eliminates predetermined low-frequency components from the information of the first image and/or the second image, and
   the shade information obtainer obtains the shade information based on the information of the first image and/or the second image of which the predetermined low-frequency components are eliminated.

2. The three-dimensional image processing apparatus according to claim 1, wherein
   the shade information obtainer further comprises a large amplitude eliminator that further eliminates components exceeding a predetermined amplitude from the information of the first image and/or the second image of which the predetermined low-frequency components are eliminated, and
   the shade information obtainer obtains the shade information based on the information of the first image and/or the second image of which the components exceeding the predetermined amplitude are eliminated.

3. The three-dimensional image processing apparatus according to claim 2, wherein
   the shade information obtainer further comprises a high-frequency eliminator that further eliminates predetermined high-frequency components from the information of the first image and/or the second image of which the components exceeding the predetermined amplitude are eliminated, and
   the shade information obtainer obtains the shade information based on the information of the first image and/or the second image of which the high-frequency components are eliminated.

4. A three-dimensional image processing apparatus comprising:
   an obtainer that obtains three-dimensional image information including information of a first image and a second image;
   a shade information obtainer that obtains shade information from the information of the first image and/or the second image; and a disparity adjuster that adjusts a disparity of a subject contained in the first and the second images based on the shade information, wherein the disparity adjuster further comprises an irregularity estimator that determines information on an irregularity of the subject contained in the first image and the second image based on the shade information, the disparity adjuster adjusts the disparity based on the information on the irregularity, and the irregularity estimator determines the information on the irregularity based on the shade information and a position of a light source illuminating the subject in the first image and the second image.

5. A three-dimensional image processing method comprising:

obtaining three-dimensional image information including information of a first image and a second image;

obtaining shade information from the information of the first image and/or the second image; and adjusting a disparity of a subject contained in the first and the second images based on the shade information, wherein the obtaining of the shade information comprises:

eliminating predetermined low-frequency components from the information of the first image and/or the second image, and obtaining the shade information based on the information of the first image and/or the second image of which the predetermined low-frequency components are eliminated.

* * * * *